US005945680A

United States Patent [19]

Jensen

[11] Patent Number: 5,945,680

[45] Date of Patent: Aug. 31, 1999

[54] METHOD FOR ACTIVATING PHOTOINITIATORS IN PHOTOSENSITIVE SUBSTRATES AND AN APPARATUS FOR CURING SUCH SUBSTRATES

[75] Inventor: Kaj Jensen, Lyngby, Denmark

[73] Assignee: Niels Lang Mathiesen and Knud Andreasen, Denmark

[21] Appl. No.: 08/913,470

[22] PCT Filed: Mar. 15, 1996

[86] PCT No.: PCT/DK96/00102

§ 371 Date: Sep. 15, 1997

§ 102(e) Date: Sep. 15, 1997

[87] PCT Pub. No.: WO96/28302

PCT Pub. Date: Sep. 19, 1996

[30] Foreign Application Priority Data

Mar. 15, 1995 [DK] Denmark ................................ 0258/95

[51] Int. Cl.$^{6}$ ........................................................ G01J 1/00

[52] U.S. Cl. .................................... 250/492.1; 250/504 R

[58] Field of Search ............................. 250/492.1, 504 R

[56] References Cited

U.S. PATENT DOCUMENTS

| | | | |
|---|---|---|---|
| 3,733,709 | 5/1973 | Bassemir et al. | 34/4 |
| 4,033,263 | 7/1977 | Richmond | 101/416 |
| 4,048,490 | 9/1977 | Troue | 250/504 R |
| 4,055,769 | 10/1977 | Sander | 250/504 R |
| 4,084,490 | 4/1978 | Doherty | 93/55.1 |
| 4,563,589 | 1/1986 | Scheffer | 250/504 |
| 4,644,899 | 2/1987 | Glaus | 250/504 R |
| 4,798,960 | 1/1989 | Keller | 250/504 |
| 5,051,666 | 9/1991 | Jensen | 315/307 |
| 5,150,253 | 9/1992 | Watanuki | 359/360 |
| 5,163,750 | 11/1992 | Natori | 362/310 |
| 5,204,534 | 4/1993 | Dubuit | 250/504 R |

FOREIGN PATENT DOCUMENTS 93 02329 2/1993 WIPO .

*Primary Examiner*—Bruce C. Anderson

*Attorney, Agent, or Firm*—Ostrolenk, Faber, Gerb & Soffen, LLP

[57] ABSTRACT

A method for activating photoinitiators in photosensitive substrates (6) like for instance printing inks, lacquers, and glue which set by radiation with UV light, and in which the photosensitive substrate and a light unit are moved relative to each other at a predetermined rate, the light unit comprising a UV light source (4) placed in a lamp housing (1) with a reflector (2, 10) for directing the UV light towards the substrate through an outlet opening, and in which the light emission is controlled by means of a control unit (50) emitting a signal to an electronic ballast (30) for the UV light source (4) depending on the mutual travel speed between the light unit and the substrate (6) and other predetermined parameters. With a view to obtaining an optimized utilization of the light effect emitted by the light source and a long duration of the light source (4) the electronic ballast (30) is of the type emitting an alternating voltage of substantially squarewave shape and substantially without interrupting the emission of current by changing poles thereof, and in that the light unit (4) is provided with means (2, 10, 17) for focusing both the direct light from the light source and the light emitted by the reflectors in a line (5) of light running parallel with the light source (4).

4 Claims, 5 Drawing Sheets

Figure 1:
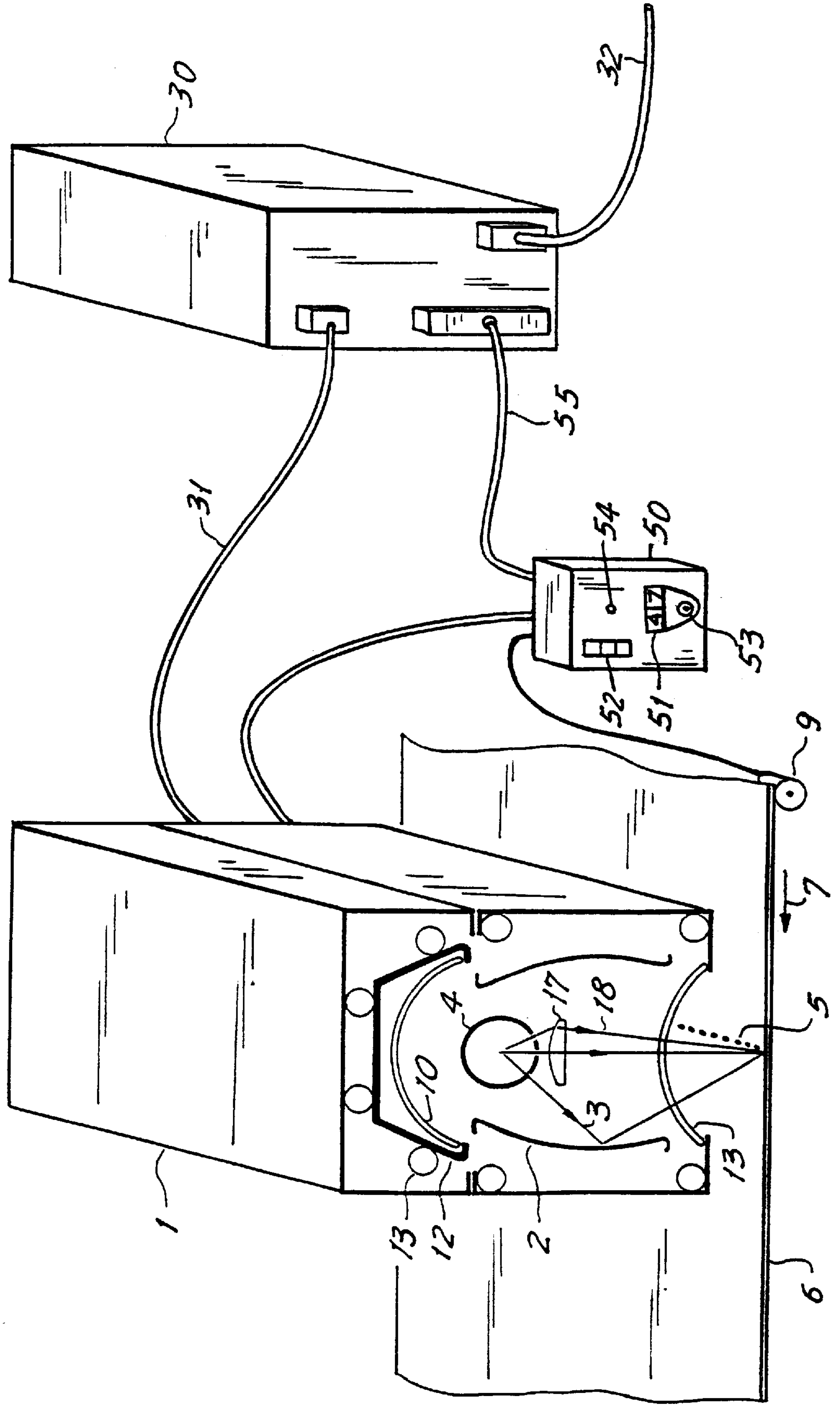

METHOD FOR ACTIVATING PHOTOINITIATORS IN PHOTOSENSITIVE SUBSTRATES AND AN APPARATUS FOR CURING SUCH SUBSTRATES

The present invention relates to a method for activating photoinitiators in photosensitive substrates like for instance printing inks, lacquers, and glue which set by radiation with UV light, and in which the photosensitive substrate and a light unit are moved relative to each other at a predetermined rate, the light unit comprising a UV light source placed in a lamp housing with a reflector for directing the UV light towards the substrate through an outlet opening, and in which the light emission is controlled by means of a control unit emitting a signal to an electronic ballast for the UV light source depending on the mutual travel speed between the light unit and the substrate and other predetermined parameters. The invention also comprises an apparatus for curing such substrates by use of the method.

Varnishes and lacquers which set by means of photoinitiators activated by UV light are used within many fields. A common feature for all the ways of using UV light for activating photoinitiators is that the quality of the curing depends on the light intensity being sufficiently strong and that light dosage—power multiplied with time per unit area, measured in joule per $cm^2$—is sufficiently strong.

The latest technology within the field of printing machines, which is an important field of use for the present invention, has up till now been limited to the mounting of simple lamp housings with reflectors and powerful UV lamps on the printing machine, so that the paper web after having been passed by a printing unit passes under a lamp housing with constant light intensity. As the speed of the paper web has to be high in order to make the printing machine pay off in an economically justifiable way, very powerful UV lights or several lamps after each other are used in order to obtain a sufficient thorough curing of the printing ink and to make it so dry, that the paper web may be rolled without any setoff of the colour. In this connection problems arise in respect of high temperature on the paper with subsequent thermal expansion, which gives inaccuracies in case of several printing proceedings following each other with different colours in a number of printing machines, or a blackcolouring of thermally sensitive paper which is used in thermoprinters.

In the new lamp constructions measures have been taken to remove some of the heat radiation, as only the UV part of the light is actively used by the photoinitiators. U.S. Pat. No. 4,563,589 discloses a method for removal of infrared radiation by a cold light mirror and a glass tube with an air based cooling system. Other systems are known, in which part of the infrared heat radiation is absorbed by the reflectors which are cooled strongly by air and water.

It is admittedly possible to increase the amount of photoinitiators in the printing ink to forward the curing process with a given light dosage. However, the photoinitiators shade one another, which primarily improves the curing in the surface, whereas it becomes worse in the depth, where the light intensity is reduced. The price of photoinitiators is moreover high compared with traditional alternatives like for instance printing inks based on ethyl alcohol. The use of printing inks based on ethyl alcohol, which inks are dried by means of hot air, does, however, entail other drawbacks, as they cause considerable environmental problems on account of the big amount of solubilizing agent released. A corresponding environmental problem does not arise by use of printing inks which are cured by means of UV light.

Environmental problems in form of too big amounts of ozone may, however, arise by using UV light, in particular where air cooled lamp housings are used, in which part of the oxygen of the air is transformed into ozone by means of the most short-waved part of the UV light with a wave length of 185 nm.

It has been realized that the photoinitiators in order to work effectively, have to receive UV light of an intensity which exceeds a certain critical level during the passage of the lamp housing. It is known to increase the intensity by gathering the light emitted from the lamp housing in a comparatively narrow area. The light intensity from the lamp has up till now been controlled by means of a mechanical ballast which does not make a so complete smoothing of the current supplied to the lamp possible that the light intensity from the lamp becomes constant. In practice the consequences of the modulated light have been avoided by partly using a surplus of light, partly by focusing only to a certain extent the emitted light on the paper web, so that the illuminated area is wider than the movement of the paper web during the time which corresponds to an oscillating period for the light intensity of the lamp.

An electronic ballast circuit is known from DK-B-167 992, by means of which a gas discharge lamp may be lit and made to light with variable effect. The electronic circuit delivers a constant current to the lamp apart from a period of less than 1 millisecond, in which the pole reverser reverses the current in consideration of the construction and durability of the lamp. Moreover, the electronic circuit makes it possible to control the effect delivered to the lamp within a broad range with for instance a factor 10 between the highest and lowest effect.

The object of the invention is to optimize the lighting process by activation of photoinitiators. The invention resides in the realization that light intensities which lie substantially above the critical level for activation of the photoinitiators only to a slight extent increase the curing effect, just as further energy supply in form of a long exposure time for already activated photoinitiators only has a comparatively small effect on the curing process. The invention therefore aims at an optimum utilization of the light emitted from a given light source such that the drawbacks and the costs in connection with the use of UV light are minimized.

The method according to the invention is characteristic in that the electronic ballast is of the type emitting an alternating voltage of substantially squarewave shape and substantially without interrupting the emission of current by changing poles thereof, and in that the light unit is provided with means for focusing both the direct light from the light source and the light emitted by the reflectors in a light streamer running parallel with the light source on the substrate.

By the method according to the invention an optimizing of the light utilization is obtained by combining a light control which ensures a nearly constant light emission with maximization of the light utilization. By focusing of the light in a comparatively narrow line a hight light intensity is obtained, the special ballast for controlling the UV light source at the same time preventing the light from being modulated to such an extent that the curing of the substrate becomes irregular.

Control of the ballast for UV light sources for curing of photosensitive substrates is known from U.S. Pat. No. 4,033,263. In this known device the effect supplied to the light source is reduced by means of a triac, whereby parts of the alternating current are cut away, and whereby the corresponding light emission from the UV light source becomes correspondingly modulated. The modulated light emission requires that the substrate is illuminated over a wide area to ensure that all areas are illuminated during the passing of the light unit, which requires a big effect from the lamp to obtain the minimum light intensity for the activation of the photoinitiators.

By the method according to the invention the light is focused in a narrow line with big light intensity and minimum modulation. Hereby a given lamp effect is optimally utilized, the drawbacks in connection with considerable dissipation of heat being reduced just as the other drawbacks like generation of ozone are reduced.

By the method according to the invention the focusing means are simplified thereby that a part of the reflector has a circular cross-section and is placed coaxially relative to the light source, such that a part of the light emitted from the light source is reflected back towards the axis of the light source. By this arrangement the light yield is increased in the opposite direction of the reflector and may be focused by means of the same reflector arrangement which is used for the light emitted directly from the light source.

According to the invention visible light and heat radiation are filtered off by means of a filter placed at the outlet opening, said filter allowing substantially only UV light to penetrate, and the part of light emitted directly from the light source towards the outlet opening passes focusing means, whereby a high light intensity in a narrow line is obtained without the thermal influence in the illuminated area becoming unacceptably heavy.

The invention also relates to an apparatus for curing photosensitive substrates by use of the method.

The apparatus is described in claims 1–4.

The object of the apparatus according to the invention is to optimize the utilization of light from an UV light source. The optimization is obtained by a combination of a current supply which ensures a substantially constant light emission with a focusing of the light to a comparatively narrow light line with a high light intensity relative to the effect emitted from the light source. The effective utilization of the light emitted entails a long duration of the light source in the light unit and makes it possible to manufacture it with small dimensions.

According to the invention the reflector comprises a cold light mirror, behind which a cooling element is placed, which is being flowed through by a cooling agent, and the cross section of the cold light mirror is a half circle, the cold light mirror being placed coaxially with the UV-light source. The cold light mirror has no focusing effect in itself, but sends the light back through the lamp, whereby it is added to the directly emitted light and is focused together with this. The arrangement makes it possible to provide a spacing between the light source and the mirror, so that the required cooling of the light source may take place.

According to the invention the means for focusing the light emitted directly from the light source towards the outlet opening is a rod-shaped lens placed parallel with the light source.

The part of the light which is not directly radiated towards the outlet opening is focused by means of reflectors which have an elliptical cross-section profile and which are placed with the light source in one of the focal points of the ellipse.

According to a particularly preferred embodiment of the apparatus according to the invention an optic filter is provided in front of the outlet opening, which filter reflects heat radiation and visible light, and which has a cross-section profile approximately corresponding to a circular section with such a radius that the direct light from the UV light source is substantially reflected towards the cold light mirror. In this embodiment the thermal load on the light source is reduced and the surface of the apparatus facing the substrate is moreover given a favourable shape, whereby the risk of the substrate getting in touch with the optical filter and staining or dirtying it is reduced. In particular the last-mentioned effect of the apparatus according to the invention is a property which in practice has turned out to be most valuable.

In the apparatus according to the invention the distance between the light source and the cold light mirror is bigger than the smallest distance between the light source and the remaining part of the reflector. This property contributes in connection with a compact design of the apparatus to making it possible still to obtain a sufficient circulation of cooling air around the light source, whereby a reasonable duration of the components used is obtained.

Figure 2:
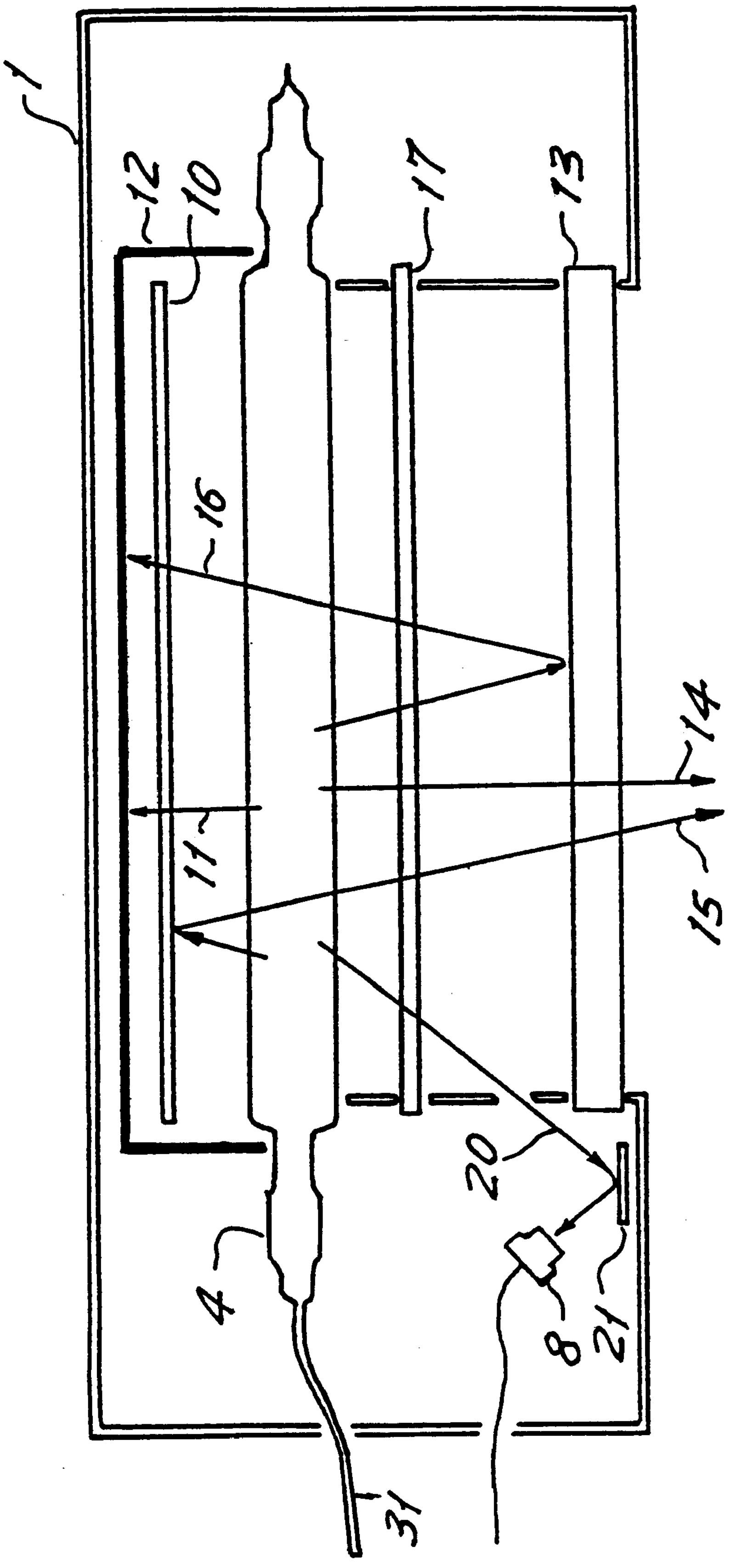
Figure 4:
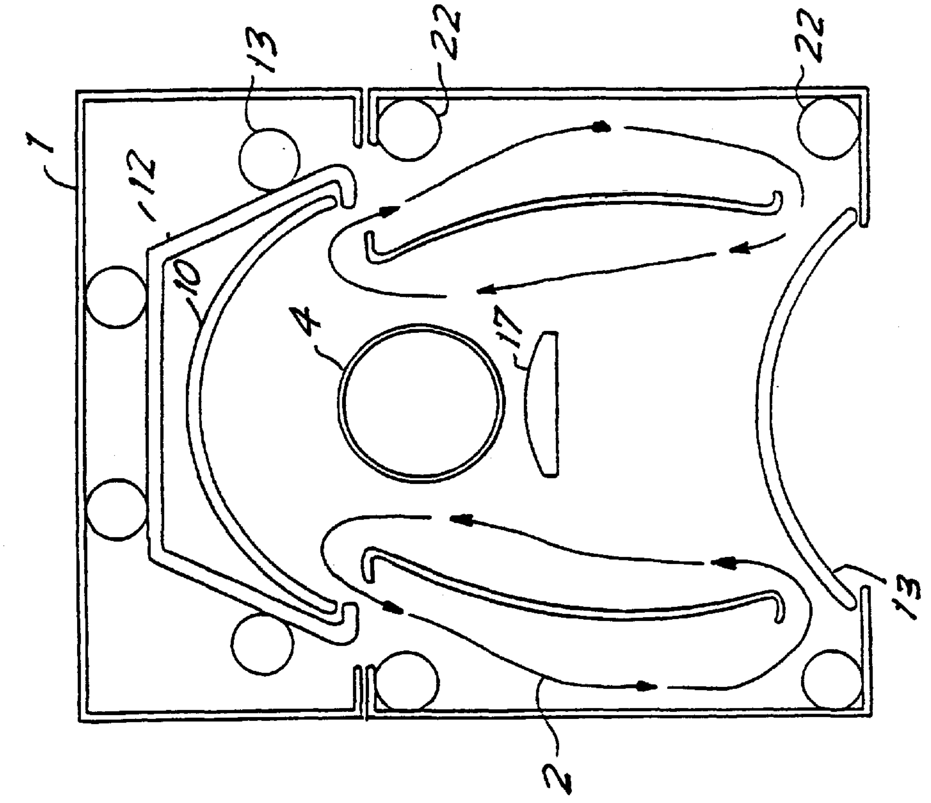
Figure 3:
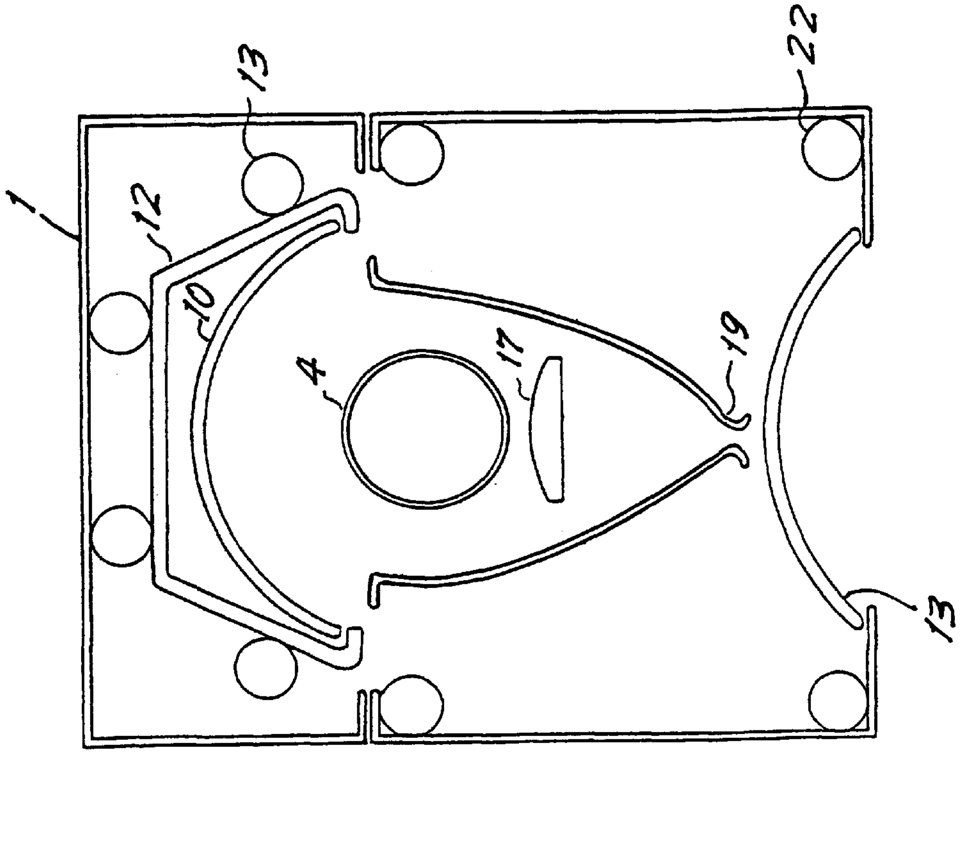
Figure 5:
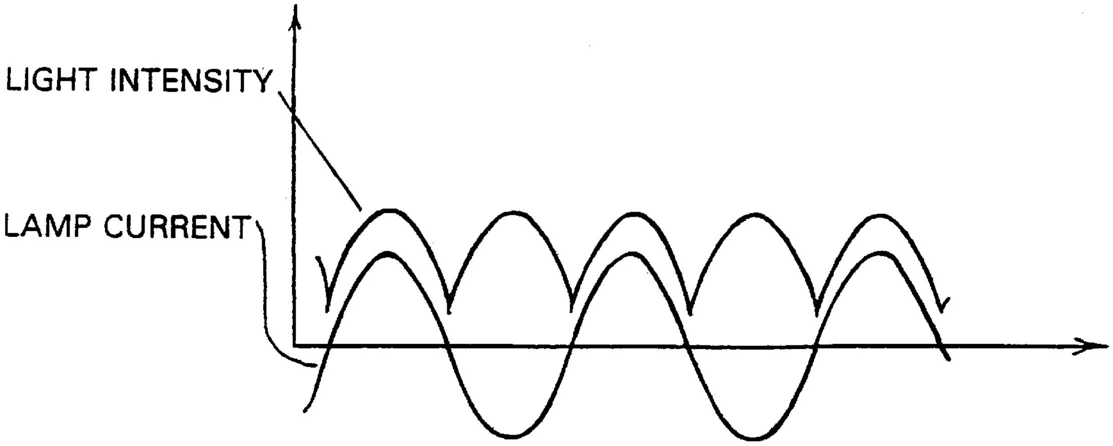
Figure 6:
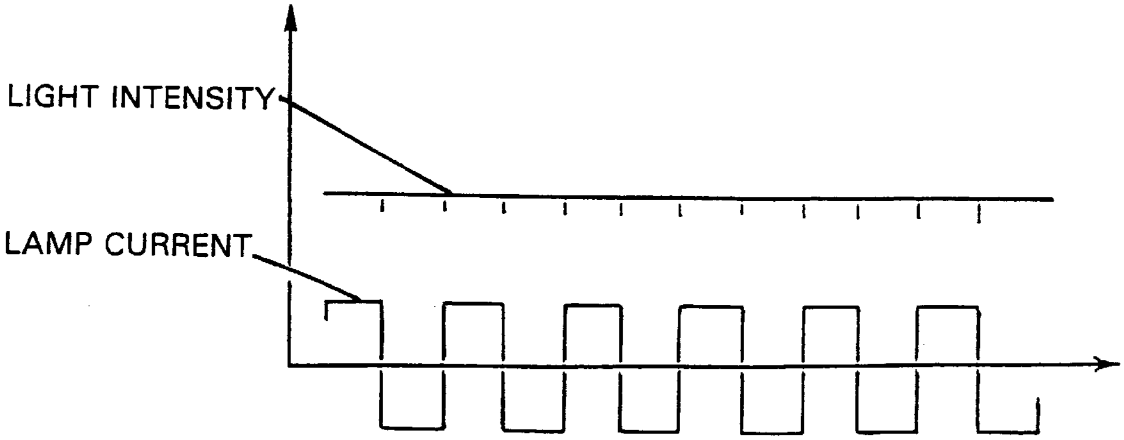
Figure 7:
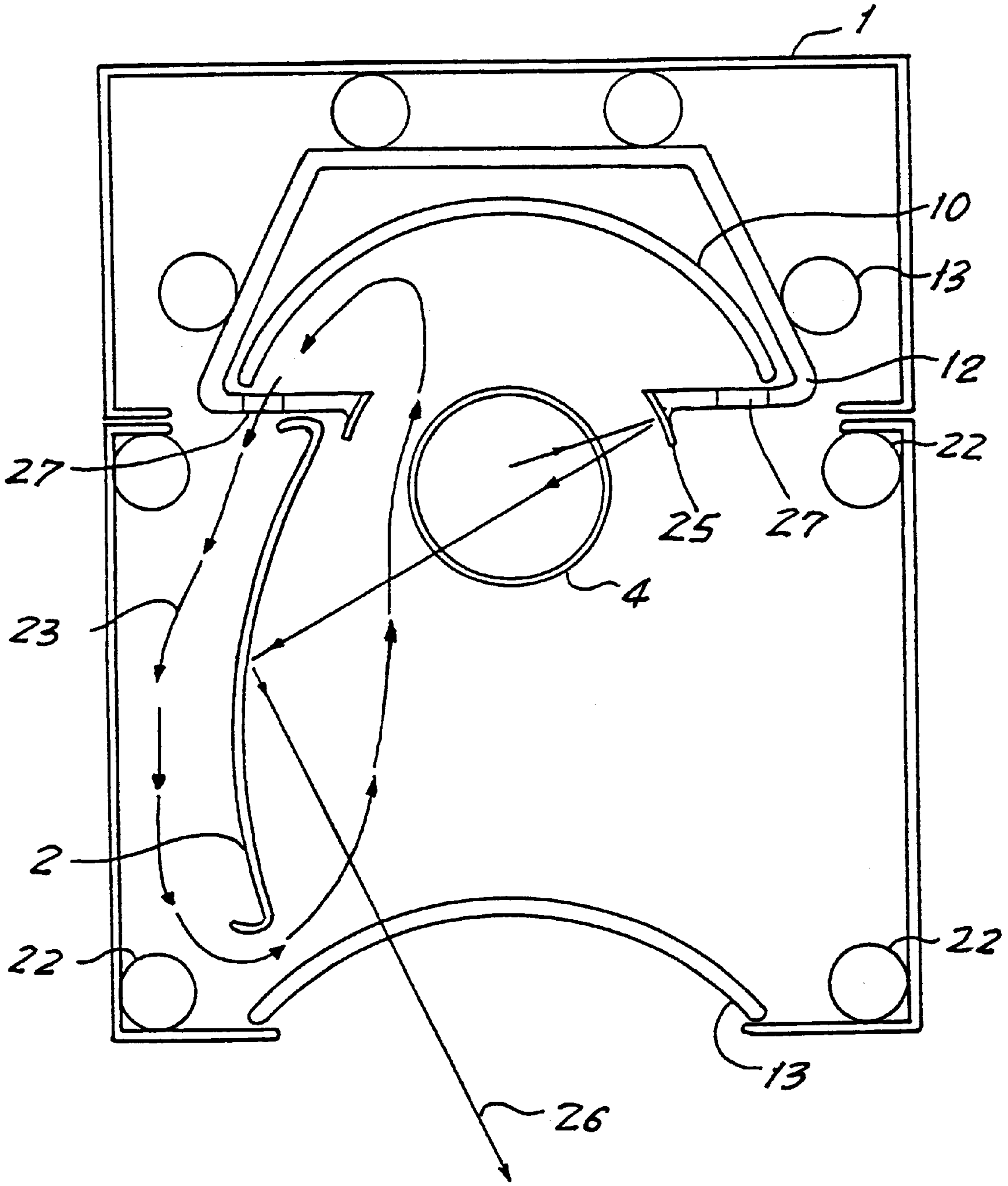

The invention will be described in detail with reference to the drawing, in which:

FIG. 1 shows the general arrangement of an apparatus for carrying out the method according to the invention, FIG. 2 is a longitudinal sectional view through a light unit according to the invention, FIG. 3 is a cross-sectional view through a light unit with broken beam path between the light source and the substrate, FIG. 4 is a cross-sectional view through a light unit in active condition, FIG. 5 shows the lamp current and the light intensity as a function of the time by use of a conventional, mechanical ballast, FIG. 6 shows the lamp current and the light intensity as a function of the time by use of an electronic ballast with pole changing, and FIG. 7 is a cross-sectional view through a light unit in a more detailed embodiment.

The apparatus shown in FIG. 1 for activating photoinitiators in photosensitive substrates in for instance printing inks, lacquers and glue, which cure by treatment with UV light, comprises a lamp housing 1 with reflector 2 for guiding the light beams from the lamp 4 to a focusing line 5 on the substrate, onto which a material 6 has been applied, and which moves below the lamp housing 1 at a predetermined travelling speed in direction towards the arrow 7. The predetermined travelling speed may be obtained either by moving the material below a stationary lamp housing or by placing the lamp housing on a robot arm such that the material need not be moved. In the power supply to the lamp an electronic ballast 30 has been inserted, said ballast being connected with the lamp by means of a cable 31. The travelling speed is registered by means of a measuring device 9 which is connected with a control panel 50. The control panel is connected with the electronic ballast which in turn is connected with the common, electric mains.

The control panel contains circuits which deliver the signals necessary for adjusting the ballast. The circuits are designed such that the electronic ballast currently adjusts the energy supplied to the UV light source to a minimum which meets the desired light dosage. As inlet signals the circuits use the registered speed of the movement and information from a light measuring device placed in the light unit. By the minimization of the light the thermal load, to which the substrate is exposed, is reduced, just as the load on the light unit is reduced. Thereby a more efficient lighting of the substrate is obtained and in particular a longer life for the UV light source. Moreover, an automatic compensation for the reduced light yield is obtained, said reduced light yield being due to wear on the UV light source. The adjustment is made currently within a speed interval, the lower limit of which may preferably be set as the lowest speed, with which the substrate may be applied to the material. If this lower limit set is exceeded, the light units are adjusted to idle run or standby to minimize possible damages which may occur on account of heat radiation from the light units. The control unit may in a simple embodiment take care of providing a linear variation between the light emission and the speed of the material, but may in more refined embodiments compensate for the fact that the photoinitiator may not have such a linear activation by being provided with a table or in another way have an unlinear dependency between the control of the lighting and the registered speed. The object of this control, which considers printing inks with an unlinear, dynamic sensitivity, i.e. that the activation level is different measured in amount of light per area unit at different light intensities, is an optimization of the lighting for the attainment of the desired curing with the least possible consumption of photoinitiators and a reduction of undesired thermal influence.

The electronic ballast is of the type which is disclosed in U.S. Pat. No. 5,051,666 or Danish Patent No. 167 992, to which is referred in relation to the details of the design of the ballast. The electronic ballast itself takes solely part in the present invention as a component and is not a part thereof. The electronic ballast is preferably designed such that the effect transferred to the lamp is not modulated by for instance 50 Hz or 60 Hz, but is on the contrary approximately constant over the time, apart from periods with a duration of less than 1 millisecond. This is different from a conventional mechanical ballast which supplies power with sine shape to the lamp, such that the effect and subsequently the light emission gets modulated with wave shape with the double frequency of the sine shape in the mains voltage. The shape of the current delivered by a mechanical ballast and the light yield is shown in FIG. 5. As will be seen from FIG. 6, which shows lamp power and light yield by use of an electronic ballast, it is possible with the apparatus according to the invention, of which the electronic ballast is a part, to obtain a constant (with a fairly good approximation) light yield, the light emission being only reduced in the short periods of less than 1 millisecond, where the poles are changed in consideration of the construction and duration of the lamp.

By means of the electronic ballast it becomes possible to control the light emission with a reaction time of approx. 1/10,000 second. This quick reaction opens the possibility of an alternative way of controlling the UV light sources, as it with a high frequency relative to the focusing width and the relative speed between light source and material becomes possible to regulate by a dutycycle-regulation. By this way of regulation an impulse is given within each period of for instance 3 milliseconds, in which the lamp is made to light with full effect in the part of the period which corresponds to the desired partial effect. It is desirable that frequency and relative speed are adjusted such that the material receives more than one light dosage during the passage, preferably two or more.

In addition to the reduction of the heating obtained by an optimization of the light emission from the light unit, the heat radiation is further reduced by an appropriate design of the lamp housing 1. As will be seen from FIG. 7, the lamp housing is provided with a cold light mirror 10 allowing heat rays 11 from the lamp to pass over a cooling element 12, where the heat is removed by through-flowing of a cooling medium, for instance water, through cooling tubes. The lamp housing 1 is provided with an outlet opening in form of a window 13 with an optic filter allowing direct rays of UV light and the reflected rays of UV light to pass, whereas rays of heat and visible light are substantially reflected back.

The cold light mirror 10 is designed as a sector of a circle and is placed concentrically with the UV light source which is preferably an elongate tubular lamp 4. UV light emitted from the lamp in direction towards the cold light mirror 10 is reflected back through the longitudinal axis of the lamp.

The window 13 is also made with a profile like a sector of a circle, UV light emitted perpendicularly to the longitudinal direction of the lamp passing the glass surface of the window nearly perpendicularly, whereas rays of heat radiated perpendicularly to the longitudinal direction of the lamp are reflected in such a way that they do not return to the lamp, but pass beside it and up through the cold light mirror 10 and into the cooling element 12.

A rod-shaped lens 17 is placed below the lamp 14 for deflection of the direct light beams such that they hit the window 13 nearly perpendicularly and are united with the rest of the UV part of the light down in the focusing line 5.

The cooling element 12 which carries the cold light mirror is bent towards the lamp 4 and is at the ends provided with mirrors 25 which are directed such that the light from the lamp 4 is reflected through it. Light which is reflected into the lamp is admittedly absorbed partially therein but also causes new light to be generated. The new light is not directionally determined, but is emitted in all directions which is no drawback on account of the efficient focusing system in the lamp housing.

The control panel 50 is in addition to a possible on-off switch and a switch for adjustment of the light dosage provided with surveillance lamps 52 which make an easy control of the function of the apparatus possible.

In the course of the life of the lamps the light yield decreases on account of wear and possible stains and dirt on the optics. This is normally corrected by overdimensioning of the lamp housing by for instance 30% by new lamp. The printer then typically operates with the lamp at full effect until it emits so little UV light that the quality of the printed matter becomes too bad. The present invention in connection with the electronic ballast solves on the other hand the wear problem of the lamp as well as other possible undesirable variations in the light intensity by arranging a UV light photometer in the lamp housing and connecting it to the electronic ballast which makes an automatic readjustment of the effect to the lamp.

The light intensity on the different colours, black, silver, green blue, yellow, etc., varies a lot, but traditional lamp housings with mechanical ballast are nearly always supplied with maximum effect. Some plants may however be adjusted to 2/3 or 1/2 effect, whereby a little energy is saved. The present invention, on the contrary, optimally saves energy and gives less heating of the paper, the light intensity being very accurately adjustable. When the printer has once found the optimum dosage of light for a given colour, he may write down the figure in Joule/cm$^2$, so the figure may be immediately set the next time this colour is to be used, irrespective of whether the travelling speed of the paper is different at the later printing process.

If the travelling speed of the paper is increased simultaneously with the setting of a high dosage of light (Joule/cm$^2$) for instance a thick, black colour, there is of course an upper limit to the amount of light which the system can deliver. As proposed according to claim 3 control lamps indicate this limit, as a green lamp lights during normal operation. If the light changes to yellow, problems are beginning to arise in connection with the supply of the desired light dosage, and if the light changes into red, there are so big problems in supplying the light dosage that the travelling speed of the paper has to be reduced. At a very high travelling speed of the paper two or three lamp housings following one another may be arranged, the electronics being synchronizable from a common control panel with buttons for manual adjustment or digital adjustment on basis of control signals from a computer.

There is also a lower limit to the emission of light from the lamp, a gas discharge lamp with an electric arc of metal vapour, to which a minimum value of effect has to be supplied in order to keep the lamp sufficiently warm for making it possible to quickly increase the effect, if the travelling speed of the paper is increased. Instead of switching off the lamp when there is no need for light, the control unit may as indicated in claim 2 be adapted to emit a control signal to small servomotors in the lamp housing, whereby the reflectors may be turned together and the light thereby set to a minimum. In the housing the light is sent from the lamp through the closed reflectors back to the lamp, which makes it easier keep the lamp in a sufficiently warm stand-by condition. When starting the printing machine the reflectors open up as soon as the paper starts moving slowly, following which the light intensity is increased concurrently with the increase of the travelling speed of the paper.

If the lamp cannot fully deliver the desired light intensity on account of wear or on account of the fact that the operation temperature is not quite correct, the electronic ballast automatically increases the flow through the lamp up to 150% of normal value, which further gives the possibility of wearing the lamp completely out before it is exchanged. This control mechanism likewise compensates the tolerances, a rectification which always has to be done in connection with new lamps.

In a preferred embodiment the lamps comprise a set of three lamps of the colours red, yellow and green. Green light indicates that the lighting unit gives the desired light dosage, whereas yellow light indicates that the lighting unit is not completely able to deliver the desired light dosage, which is a sign that the lamp should be exchanged, but the problem may be solved straight away by reducing the speed. Red light indicates that the lamp is unable to deliver the desired light dosage. When starting the apparatus by connecting it to the mains voltage the control unit takes care of the electronic ballast delivering such a power to the lamp that it is heated to a "stand-by"-condition in which it emits UV light. Through feedback from the light meter 8 this stand-by position is maintained with a minimum supply of energy from the mains. In the stand-by position the reflectors in the lamp housing are turned simultaneously and bar the light path between the lamp and the outlet opening. By closing the reflectors the direction of radiation is changed in direction towards the lamp, which contributes to holding it warm, when it only receives current for stand-by operation.

The desired light dosage may either be set as a numerical value on the control panel or it may alternatively be set by a computer controlling the machine, on which the light unit is used. A calibration button for the light meter built into the lamp housing may also be provided on the control panel. When exchanging the lamp there is a possibility of making an adjustment of the light meter, if a lamp is inserted which is calibrated and the light meter is adjusted to a value corresponding to the reference value measured at the calibration of the light intensity of the lamp. By use of the lamp as light normal it is possible in a simple and cheap way to adjust the light meter which on account of the short-waved light, to which it is exposed, gradually will lose some of its sensitivity.

The lamp housing is shown in a longitudinal view in FIG. 2. It will be seen that the UV light source 10 is an elongate tubular lamp placed along the housing. Above the lamp the cold light mirror and the cooling element are provided. In extension of the outlet opening a mirror 21 is arranged which substantially only reflects UV light, and in the light beam reflected from this mirror the light meter 20 registering the light yield is placed. As will be seen from FIG. 5, which shows the lamp housing in a sectional view, the cooling arrangement also comprises cooling tubes 22 placed along the side walls of the lamp housing. The suspension of the cold light mirror is such that heated air which passes the lamp 4, may pass downwards between the reflectors 2 and the outer walls of the housing and thus become cooled by means of the cooling tubes 22. It is important that sufficient cooling is provided in the lamp housing, as the lamp housing in consideration of preventing ozone leakage is designed as a closed construction. Due to the closed construction dust is also prevented from entering, which dust may i.a. settle on the mirrors and deteriorate the light yield.

In view of improving the yield of light, which activates the photoinitiators, it is advantageous that a non-oxygenating atmosphere is created around the lighting units and the means for applying the substrate, for instance by supplying nitrogen to these areas. According to the invention this supply is made dependent on the relative travelling speed by controlling a control valve by means of a signal delivered from the control unit. At increasing speed the supply is increased, and at a standstill the supply is discontinued, whereby i.e. leakage and waste of nitrogen during longer periods of standstill are avoided.

I claim:

1. An apparatus for curing photosensitive substrates like for instance printing inks, lacquers and glue containing photoinitiators for a curing process in the substrate, which apparatus comprises a light unit to be placed in a device for establishing a relative movement between the substrate and the light unit, and which light unit comprises a lamp housing with an UV-light permeable window and with an elongate, cylindrical UV light source, which is provided with a current controlling, electronic ballast, and which lamp housing comprises a system of reflectors including cold mirror means for directing the the light from the UV-source towards the UV-light permeable window, characterized in that between the light source and the window lens means are provided for focusing light emitted directly form the light source towards the window in a narrow illumindated field on the substrate, that the cold mirror has a cross section which is part of a circle, the centre of which is placed on the axis of the light source and which mirror is arranged on the side of the light source opposite the window in an interspace between two elliptical mirrors focusing reflected UV-light on the narrow illuminated field on the substrate.

2. An apparatus according to claim 1, characterized in that the filtering means of the UV-permeable window has a cross section corresponding to a part of a circle.

3. An apparatus according to claim 1, characterized in that the distance between the light source and the cold light mirror is bigger than the smallest distance between the light source and and the remaining part of the reflectors.

4. An apparatus for curing photosensitive substrates like for instance printing inks, lacquers and glue containing photoinitiators for a curing process in the substrate, which apparatus comprises a light unit to be placed in a device for establishing a relative movement between the substrate and the light unit, and which light unit comprises a lamp housing with an UV light source, which is provided with a current controlling, electronic ballast, and a reflector for directing the UV light towards the substrate through an outlet opening, characterized in that the electronic ballast is of the type emitting an alternating voltage of substantially square-wave shape and substantially without interrupting the emission of current by changing poles thereof, and in that the light unit is provided with means for focusing both the direct light from the light source and the light emitted by the reflectors in a light streamer running parallel with the light source and characterized in that the reflector comprises a cold light mirror, behind which a cooling element, which is being flowed through by a cooling agent, is placed and the cross section of the cold light mirror is a half circle, the cold light mirror being placed coaxially with the UV-light source and characterized in that the means for focusing the light emitted directly from the light source towards the outlet opening is a rod-shaped lens placed parallel with the light source.

* * * * *